US012595849B2

(12) United States Patent
    Bao et al.

(10) Patent No.:    US 12,595,849 B2
(45) Date of Patent:        Apr. 7, 2026

(54) SEAL RING INSTALLATION MODULE AND SEAL RING INSTALLATION SYSTEM

(71) Applicants: Tyco Electronics (Shanghai) Co., Ltd., Shanghai (CN); TE Connectivity Services GmbH, Schaffhausen (CH)

(72) Inventors: Xianghao (Jorge) Bao, Shanghai (CN); Jian Cao, Shanghai (CN); Dandan (Emily) Zhang, Shanghai (CN); Fengchun (Fred) Xie, Shanghai (CN); Roberto Francisco-Yi Lu, Bellevue, WA (US); Lei (Alex) Zhou, Shanghai (CN); Lvhai (Samuel) Hu, Shanghai (CN)

(73) Assignees: Tyco Electronics (Shanghai) Co., Ltd., Shanghai (CN); TE Connectivity Solutions GmbH, Schaffhausen (CH)

( * ) Notice:   Subject to any disclaimer, the term of this patent is extended or adjusted under 35 U.S.C. 154(b) by 351 days.

(21) Appl. No.: 18/176,545

(22) Filed:      Mar. 1, 2023

(65) Prior Publication Data

US 2023/0279949 A1      Sep. 7, 2023

(30) Foreign Application Priority Data

Mar. 1, 2022      (CN) .......................... 202210193941.6

(51) Int. Cl.
    *B23P 19/00*        (2006.01)
    *B23P 19/08*        (2006.01)
    *F16J 15/3268*      (2016.01)

(52) U.S. Cl.
    CPC ......... *F16J 15/3268* (2013.01); *B23P 19/084* (2013.01)

(58) Field of Classification Search
    CPC ......... B23P 19/00; B23P 19/04; B23P 19/007; B23P 19/084
    See application file for complete search history.

(56)              References Cited

U.S. PATENT DOCUMENTS 4,144,625  A  *  3/1979  Hogenhout  ............... B21J 15/10
                                                            29/458
4,265,434  A  *  5/1981  Hamilton  ................ B25B 5/061
                                                            92/33
5,761,785  A  *  6/1998  Connolly  .............. B23P 19/045
                                                            29/244

(Continued)

*Primary Examiner* — Lee D Wilson
(74) *Attorney, Agent, or Firm* — Barley Snyder

(57)              ABSTRACT

A seal ring installation module comprises a seal ring pickup and transfer device adapted to pick up a seal ring and transfer the seal ring to a component. The pickup and transfer device includes a support member and an outer cylinder sleeved on the support member. The support member has an external shape or at least one external dimension corresponding to those of the component. One end of the support member protrudes from an opening at one end of the outer cylinder to pick up and support the seal ring. One of the outer cylinder or the support member is movable axially relative to the other and is adapted to, with the component axially aligned with and contacting the one end of the support member, transfer the seal ring supported on the one end of the support member from the support member to the component under a biasing force applied by an end face of one end of the outer cylinder.

18 Claims, 11 Drawing Sheets

(56) References Cited

U.S. PATENT DOCUMENTS

| | | | |
|---|---|---|---|
| 6,330,737 B1 * | 12/2001 | Lowemark | B25B 27/24 |
| | | | 29/280 |
| 8,640,829 B2 * | 2/2014 | Block, Jr. | B66B 9/04 |
| | | | 29/525.01 |
| 11,780,520 B1 * | 10/2023 | Staples | B62J 1/06 |
| | | | 297/199 |
| 2009/0121403 A1 * | 5/2009 | McIntosh | B25B 5/16 |
| | | | 269/32 |
| 2023/0122591 A1 * | 4/2023 | Sui | B23Q 3/082 |
| | | | 269/20 |
| 2023/0279949 A1 * | 9/2023 | Bao | B23P 19/084 |
| | | | 277/551 |

* cited by examiner

SEAL RING INSTALLATION MODULE AND SEAL RING INSTALLATION SYSTEM

CROSS-REFERENCE TO RELATED APPLICATIONS

This application claims the benefit of Chinese Patent Application No. 202210193941.6 filed on Mar. 1, 2022, in the State Intellectual Property Office of China, the whole disclosure of which is incorporated herein by reference.

FIELD OF THE INVENTION

The present invention relates to a seal ring installation module and a seal ring installation system including the seal ring installation module.

BACKGROUND

In the prior art, components such as connectors often utilize sealing elements or rings to protect the connector from environmental intrusions. The seal ring is usually manually installed on or within the component, for example, on a connector housing to achieve the sealing of the connector housing. However, it is difficult to install the seal ring manually because the seal ring is typically adhered with oil, making it difficult to handle. As such, efficiency of manual installation of the seal ring is very low, and the seal ring is often damaged as a result of excess or improper handling.

SUMMARY

A seal ring installation module according to an embodiment of the present disclosure comprises a seal ring pickup and transfer device adapted to pick up a seal ring and transfer the seal ring to a component. The pickup and transfer device includes a support member and an outer cylinder sleeved on the support member. The support member has an external shape or at least one external dimension corresponding to those of the component. One end of the support member protrudes from an opening at one end of the outer cylinder to pick up and support the seal ring. One of the outer cylinder or the support member is movable axially relative to the other and is adapted to, with the component axially aligned with and contacting the one end of the support member, transfer the seal ring supported on the one end of the support member from the support member to the component under a biasing force applied by an end face of one end of the outer cylinder.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
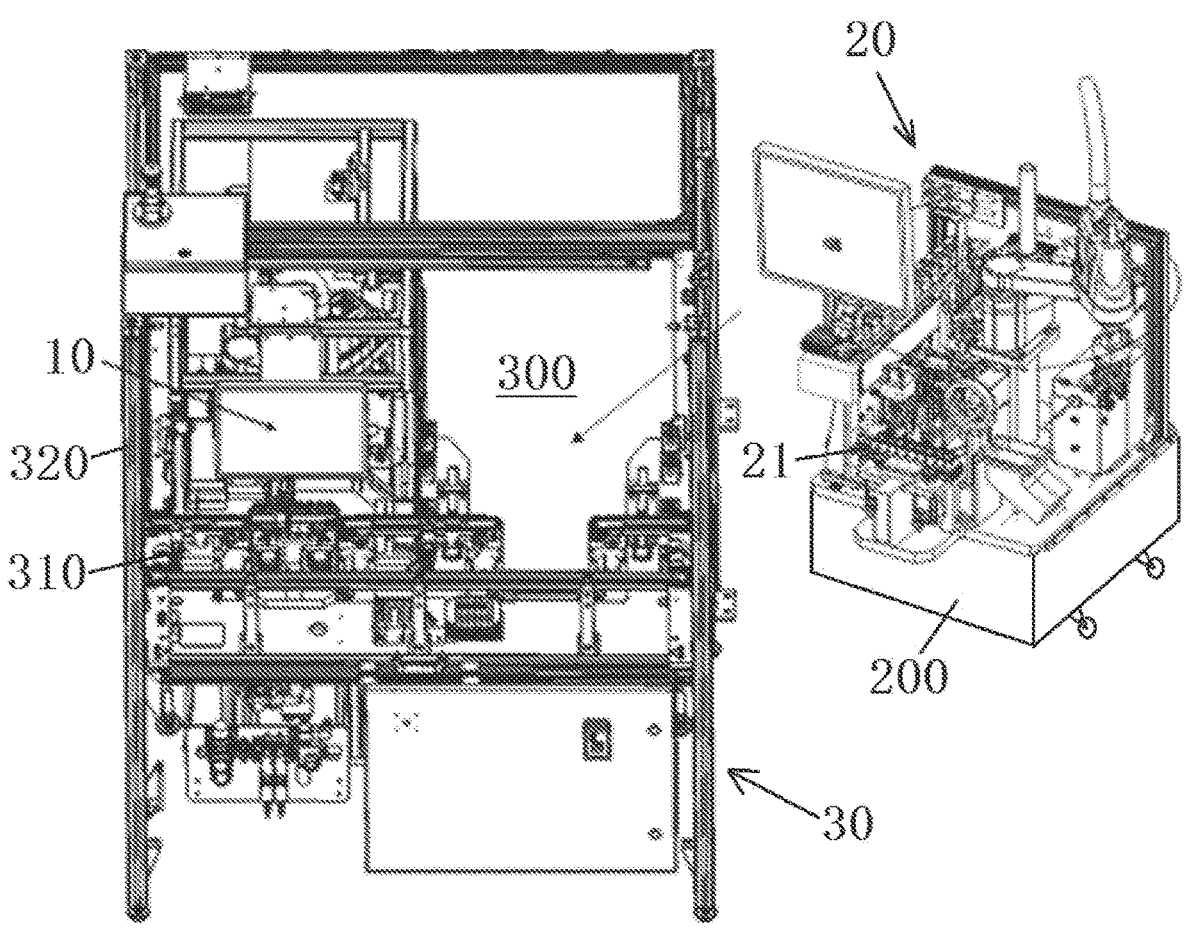
FIG. 1 shows an illustrative view of a seal ring installation system according to an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to an embodiment of the present invention, a seal ring installation module comprises a seal ring pickup and transfer device adapted to pick up an opened seal ring and transferring it to a component. The seal ring pickup and transfer device includes a support member, the external shape and dimension of which are the same as those of the component, and an outer cylinder which is sleeved on the supporting member. One end of the support member protrudes from an opening at one end of the outer cylinder to pick up and support the opened seal ring. One of the outer cylinder or the support member is movable axially relative to the other. In this way, a seal ring supported on the one end of the support member is transferable from the support member to the component that is axially aligned and contacted with the one end of the support member under the biasing force of an end face of one end of the outer cylinder.

Figure 2:
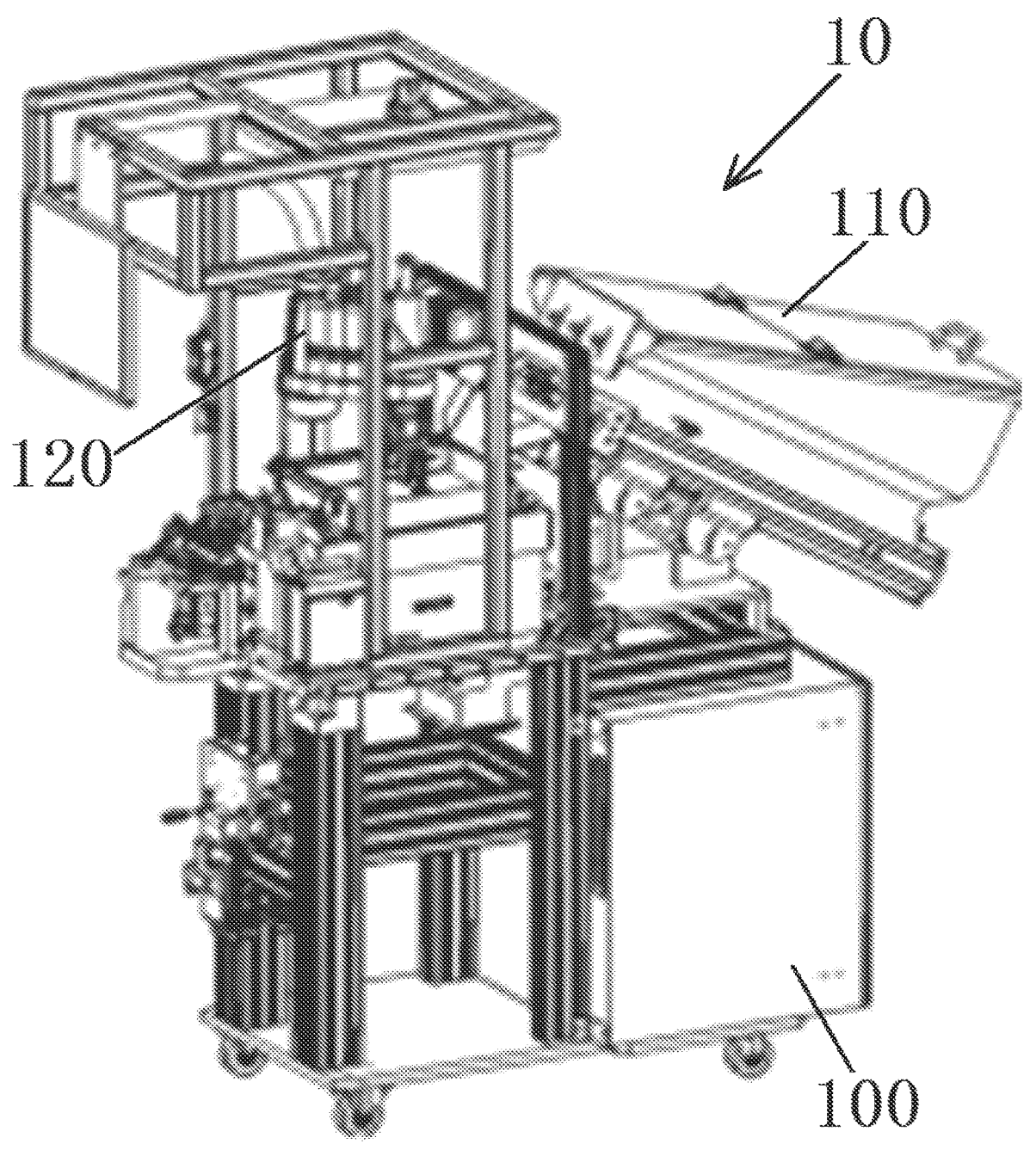
FIG. 2 shows an illustrative perspective view of a seal ring supply module according to an exemplary embodiment of the present invention.
Figure 3:
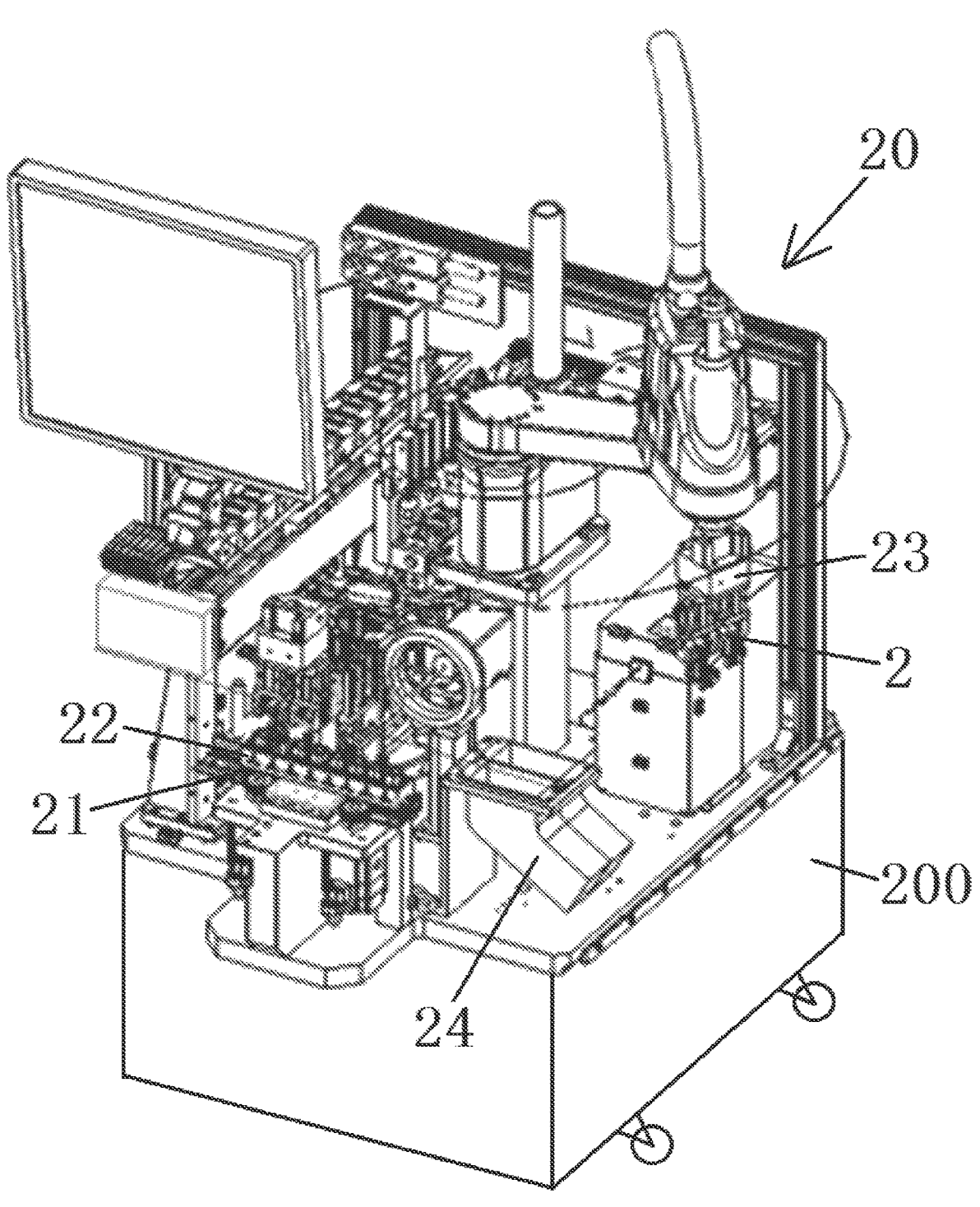
FIG. 3 shows an illustrative perspective view of a seal ring installation module according to an exemplary embodiment of the present invention.

FIG. 1 shows an illustrative view of a seal ring installation system according to an exemplary embodiment of the present invention. FIG. 2 shows an illustrative perspective view of a seal ring supply module 10 according to an exemplary embodiment of the present invention. FIG. 3 shows an illustrative perspective view of a seal ring installation module 20 according to an exemplary embodiment of the present invention.

As shown in FIGS. 1-3, in the illustrated embodiment, the seal ring installation system includes a seal ring supply module 10 and a seal ring installation module 20. The seal ring supply module 10 is used to supply the seal ring 1 to the seal ring installation module 20.

Figure 8:
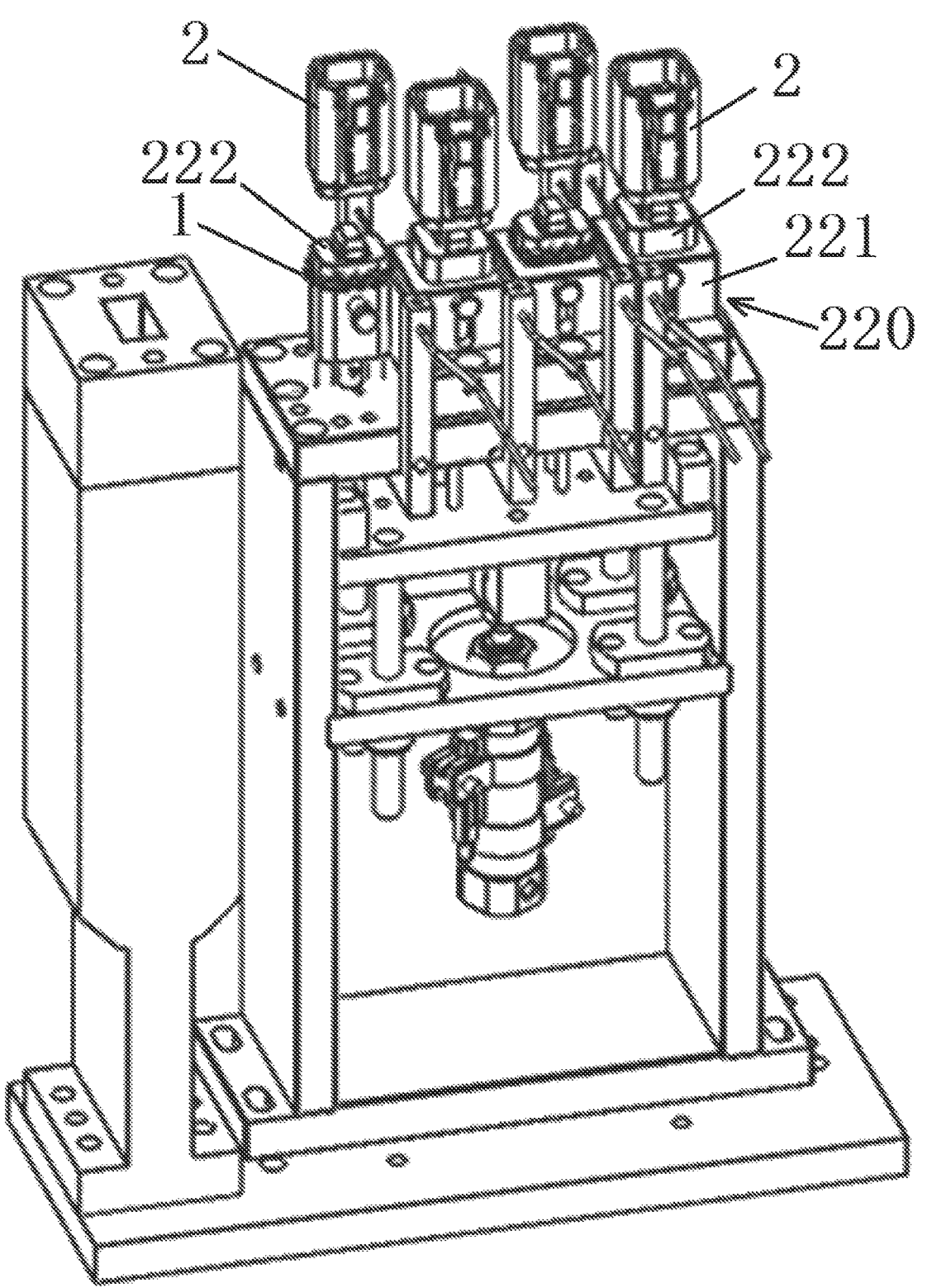
FIG. 8 shows an illustrative perspective view of a seal ring pickup and transfer device according to an exemplary embodiment of the present invention.
Figure 9:
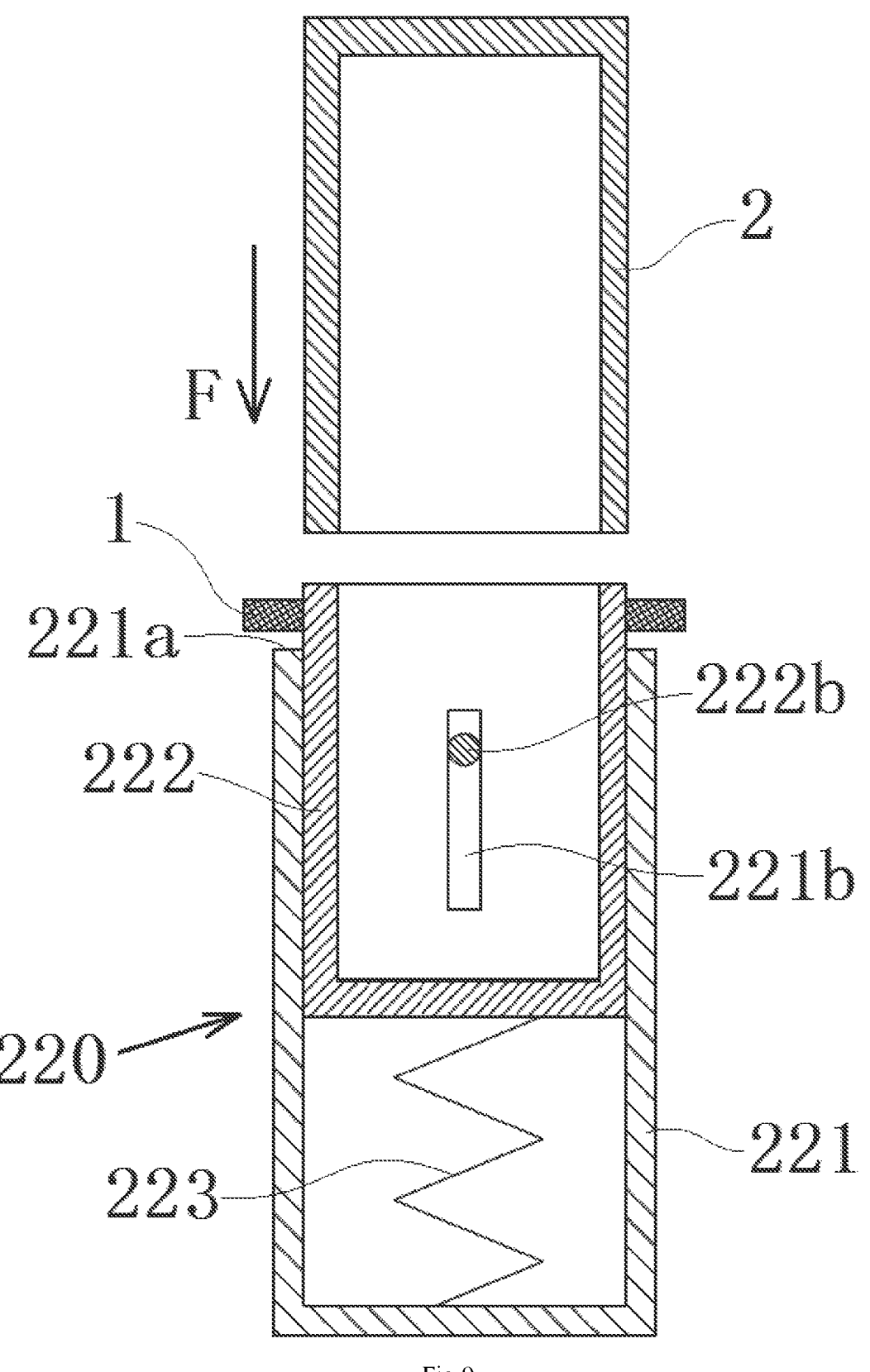
FIG. 9 shows an illustrative view of transferring the seal ring to the component by the seal ring pickup and transfer device shown in FIG. 8, in which the component has not yet contacted the end face of the support member.
Figure 10:
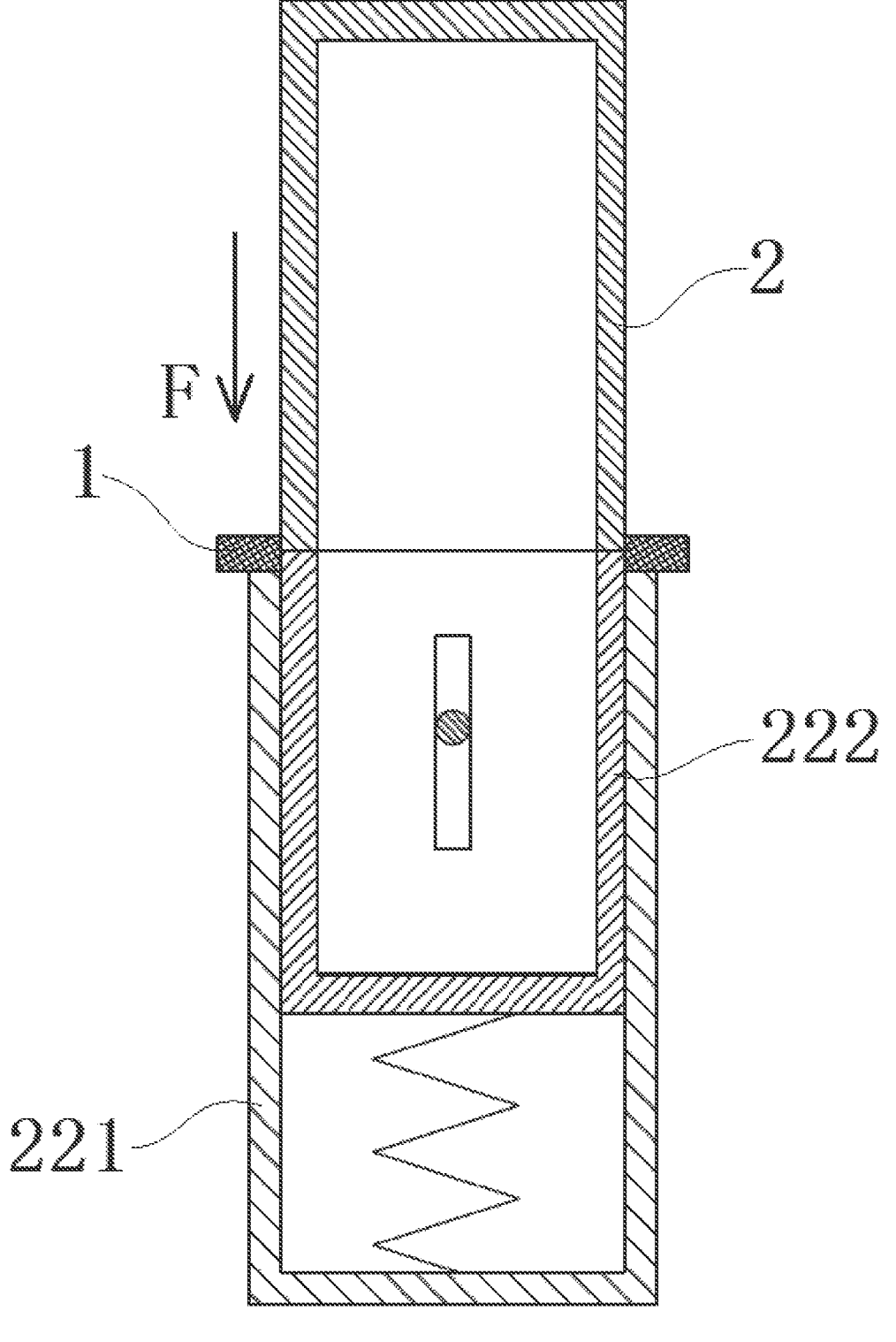
FIG. 10 shows an illustrative view of transferring the seal ring to the component by the seal ring pickup and transfer device shown in FIG. 8, in which the component has contacted the end face of the support member, and the seal ring has been partially transferred to the component.
Figure 11:
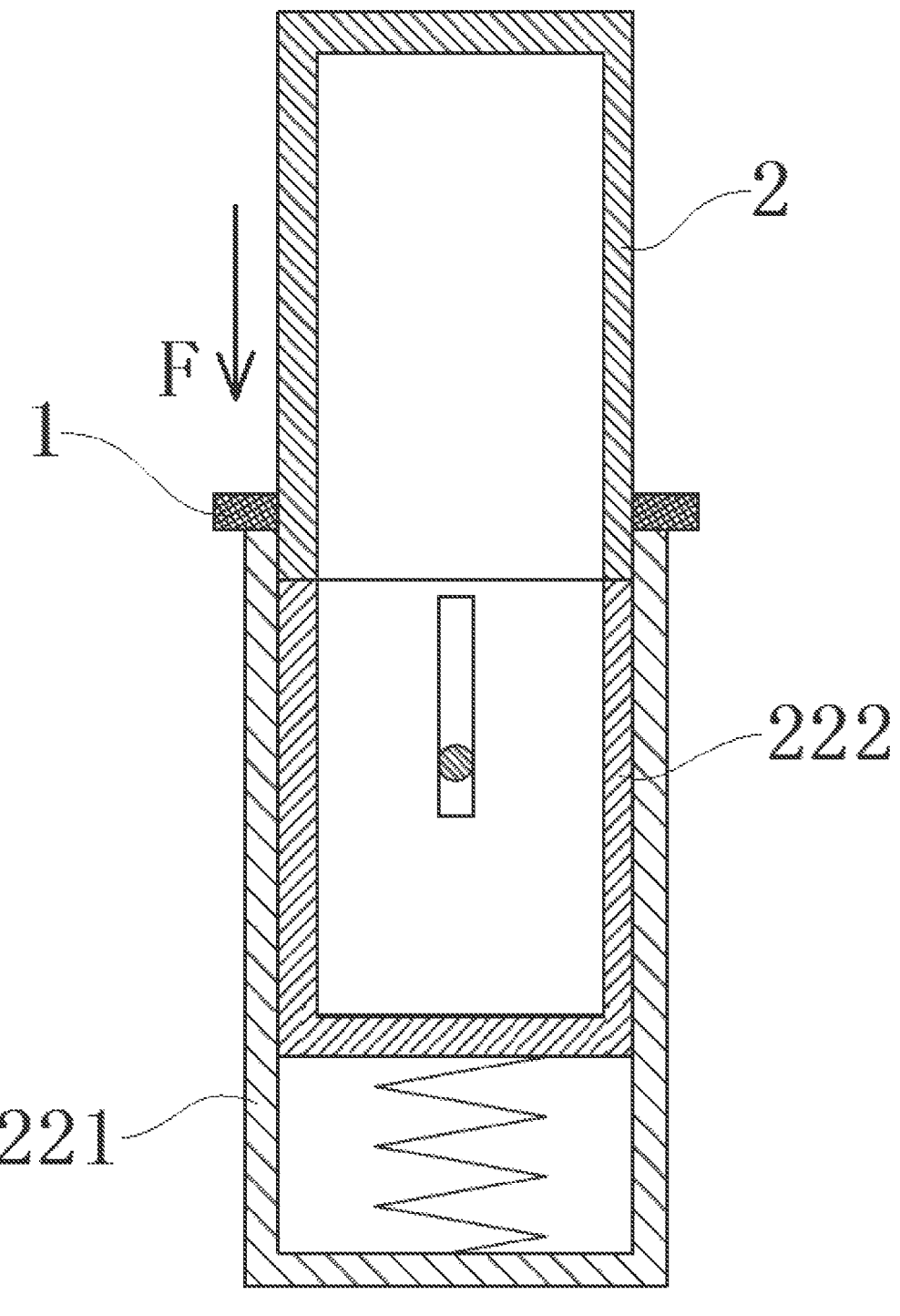
FIG. 11 shows an illustrative view of transferring the seal ring to the component by the seal ring pickup and transfer device shown in FIG. 8, in which the seal ring has been completely transferred to the component.

FIG. 8 shows an illustrative perspective view of a seal ring pickup and transfer device 220 according to an exemplary embodiment of the present invention. FIG. 9 shows an illustrative view of the transference of a seal ring 1 to a component 2 by the seal ring pickup and transfer device 220 shown in FIG. 8, wherein the component 2 has not yet contacted the end face of a support member 222. FIG. 10 shows an illustrative view of the transference of the seal ring 1 to the component 2 by the seal ring pickup and transfer device 220 shown in FIG. 8, wherein the seal ring 1 has been partially transferred to the component 2. FIG. 11 shows an illustrative view of the transference of the seal ring 1 to the component 2 by the seal ring pickup and transfer device 220 shown in FIG. 8, wherein the seal ring 1 has been completely transferred to the component 2.

As shown in FIGS. 8-11, the seal ring installation module 20 includes the seal ring pickup and transfer device 220. The seal ring pickup and transfer device 220 is adapted to pick up the opened seal ring 1 and transfer the picked seal ring 1 to the component 2. The seal ring pickup and transfer device 220 includes the support member 222 and an outer cylinder 221. The external shape and dimensions of the support member 222 are the same as those of the component 2. The outer cylinder 221 is sleeved on the support member 222. One end of the support member 222 protrudes from an opening at one end of the outer cylinder 221 to pick up and support the seal ring 1 that has been opened. One of the outer cylinder 221 and the support member 222 can be moved axially with respect to the other, so that the seal ring 1 supported on one end of the support member 222 can be transferred from the support member 222 to the component 2 axially aligned and contacted with one end of the support member 222 under the push of the end face 221a of one end of the outer cylinder 221.

In the exemplary embodiment, the outer cylinder 221 is a fixed part that cannot be moved, and the support member 222 is a movable part that can be moved axially with respect to the outer cylinder 221. The seal ring installation module 220 also includes a spring 223. The spring 223 is supported on the other end of the support member 222 so that the support member 222 is floated axially with respect to the outer cylinder 221. After the component 2 is axially aligned with one end of the support member 222, the component 2 pushes the support member 222 to move towards the inside of the outer cylinder 221, so that the seal ring 1 is transferred to the component 2.

A guide slot 221b extending axially is formed on one of the outer cylinder 221 and the support member 222, and a convex guide pin 222b is formed on the other. The guide pin 222b is slidably fitted with the guide slot 221b to guide one of the support member 222 and the outer cylinder 221 to move axially with respect to the other.

The shape and dimension of the inner cavity of the outer cylinder 221 are the same as the external shape and dimension of the support member 222 and the component 2, so that the support member 222 and the component 2 can be matched into the inner cavity of the outer cylinder 221.

Figure 4:
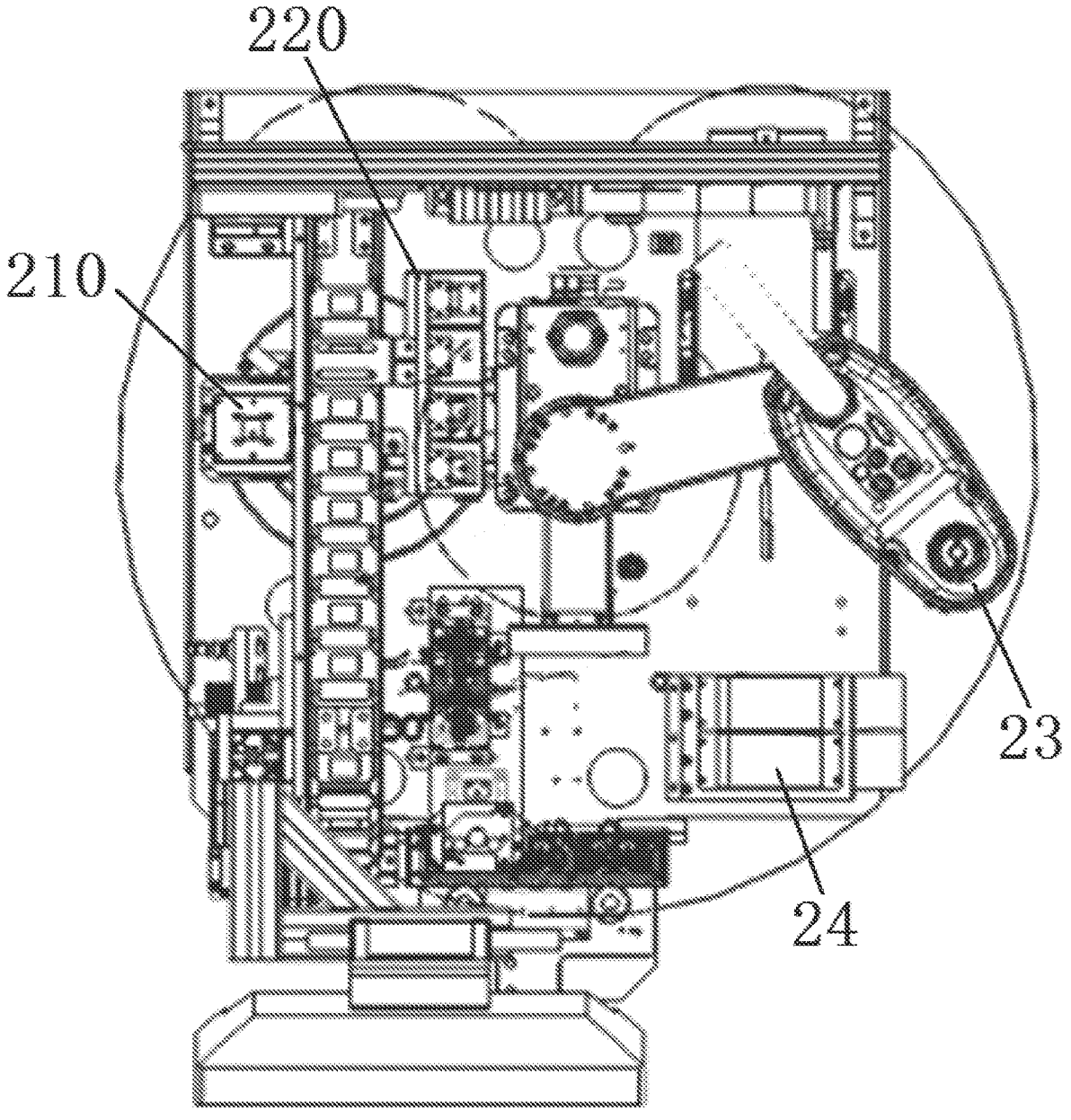
FIG. 4 shows an illustrative plan view of a seal ring installation module according to an exemplary embodiment of the present invention.
Figure 6:
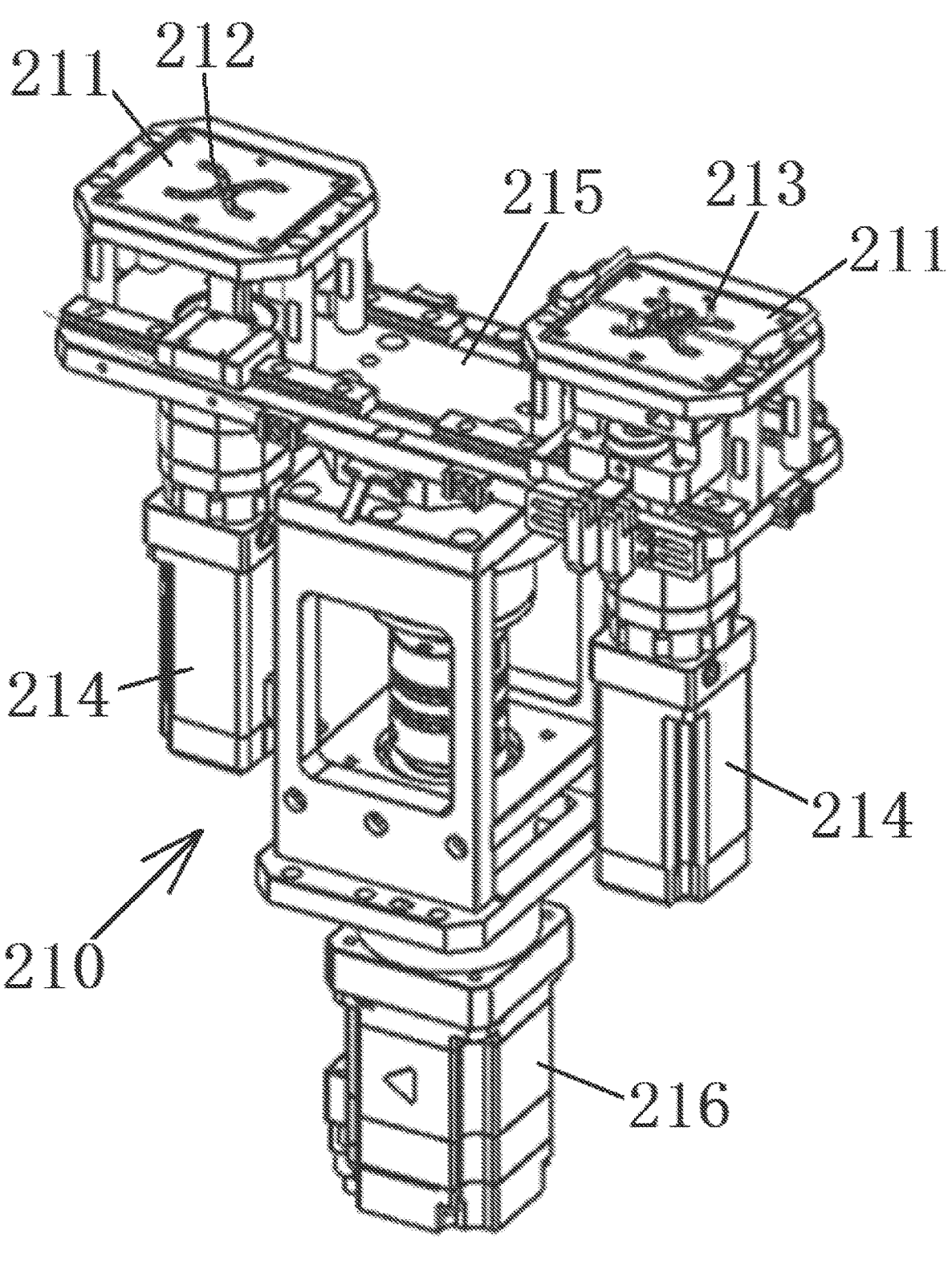
FIG. 6 shows an illustrative perspective view of a seal ring opening device according to an exemplary embodiment of the present invention.
Figure 7:
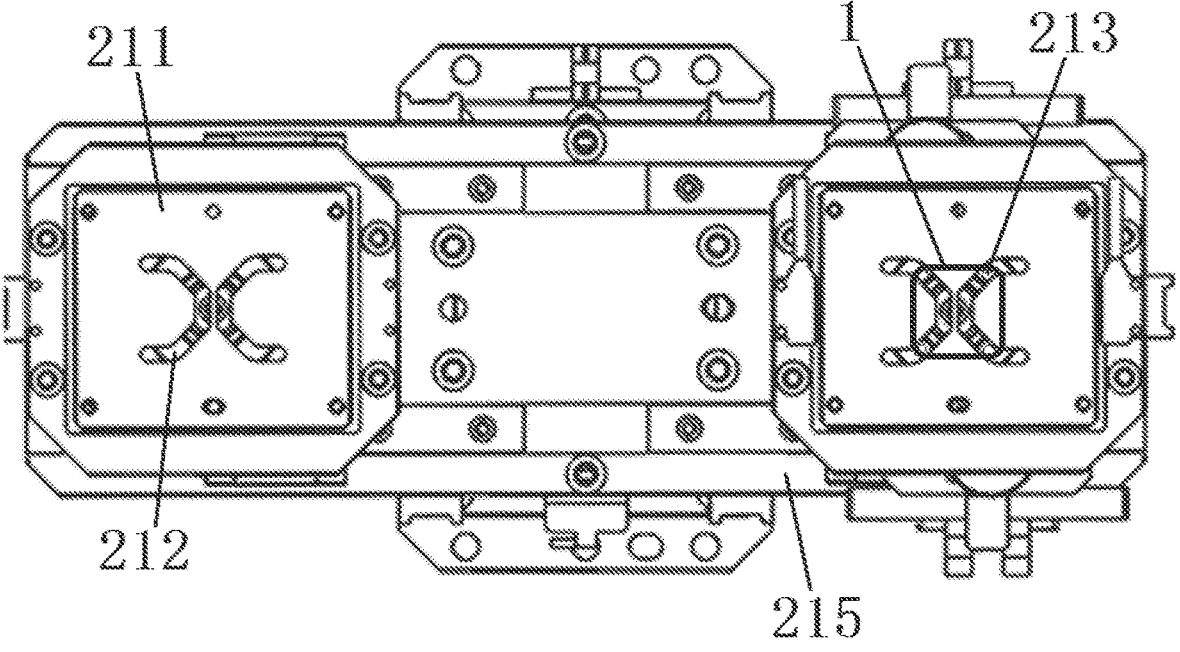
FIG. 7 shows an illustrative plan view of a seal ring opening device according to an exemplary embodiment of the present invention.

FIG. 4 shows an illustrative plan view of the seal ring installation module 20 according to an exemplary embodiment of the present invention. FIG. 6 shows an illustrative perspective view of the seal ring opening device 210 according to an exemplary embodiment of the present invention. FIG. 7 shows an illustrative plan view of a seal ring opening device 210 according to an exemplary embodiment of the present invention.

As shown in FIG. 4 and FIGS. 6-11, in the illustrated embodiment, the seal ring installation module 20 also includes a seal ring opening device 210. The seal ring opening device 210 includes two seal ring opening units 211, 212, 213, 214 suitable for expanding two seal rings 1 to a predetermined expansion state respectively. The seal ring opening unit 211, 212, 213, 214 includes a support plate 211, four pins 213 and a first driving device 214. Two cross chutes 212 are formed on the support plate 211. The four pins 213 are suitable for synchronously be moved far away from each other along the chutes 212 to expand the seal ring 1. The first driving device 214 for driving four pins 213 to move. When one end of the support member 222 of the seal ring pickup and transfer device 220 is inserted into the opened seal ring 1, four pins 213 are moved out of the chutes 212, so that the seal ring 1 is released and transferred to the one end of the support member 222.

In the illustrated embodiment, the seal ring opening device 210 also includes a rotating plate 215 and a second driving device 216. Two seal ring spreaders 211, 212, 213, 214 are installed on the rotating plate 215. The second driving device 216 is used for driving the rotating plate 215 to rotate. When one of the two seal ring opening units 211, 212, 213, 214 is turned to the seal ring loading station by the rotating plate 215, the other is turned to the seal ring expansion station. When the seal ring opening unit 211, 212, 213, 214 is rotated to the seal ring loading station, the seal ring 1 is loaded on the four pins 213. When the seal ring opening unit 211, 212, 213, 214 is rotated to the seal ring expansion station, the seal ring 1 is expanded to the predetermined expansion state by four pins 213.

The seal ring installation module 20 further includes a first transmission device 21 and a first robot 23. The first transmission device 21 is used for transmitting a carrier 22, with the carrier conveying the component 2 without the seal ring 1 fitted thereto. The first robot 23 is adapted to grasp the component 2 and move the grasped component 2, so that the component 2 is axially aligned with one end of the support member 222 and pushes the support member 222 to move towards the interior of the outer cylinder 221.

The seal ring installation module 20 also includes a discharge funnel 24. The discharge funnel 24 is used to unload the component 2 with the seal ring 1 into a container. After the seal ring 1 has been installed on the component 2, the first robot 23 places the component 2 into the inlet of the discharge funnel 24.

The seal ring supply module 10 includes a vibration feeding device 110 and a second robot 120. The vibration feeding device 110 is adapted to convey the seal ring 1 forward through vibration and vibrate the seal ring 1 into a predetermined posture. The second robot 120 is adapted to grab the seal ring 1 in a predetermined posture and load the captured seal ring 1 onto the seal ring installation module 20.

The seal ring installation module 20 further includes a first mobile car 200. In one embodiment, all other parts of the seal ring installation module 20 are integrated on the first mobile car 200. In this way, the entire seal ring installation module 20 can move freely and independently. In the illustrated embodiment, the seal ring supply module 10 also includes a second mobile car 100, with all other parts of the seal ring supply module 10 integrated on the second mobile car. In this way, the entire seal ring supply module 10 can move freely and independently.

As shown in FIGS. 1-4 and 6-11, the seal ring installation system also includes a docking station 30, which is used for docking with the seal ring supply module 10 and the seal ring installation module 20 to achieve mechanical and electrical connection with the seal ring supply module 10 and the seal ring installation module 20. The seal ring supply module 10 and the seal ring installation module 20 also include respective interfaces for realizing power connections and/or signal connections. The docking station 30 comprises a frame 320 and two matching interfaces. Two docking chambers 300 suitable for docking with a respective one of the seal ring supply module 10 and the seal ring installation module 20 are provided in the frame 320. Two matching interfaces are installed on the frame 320 for matching with the interfaces on the seal ring supply module 10 and the seal ring installation module 20, respectively, to realize power connections and/or signal connections.

Figure 5:
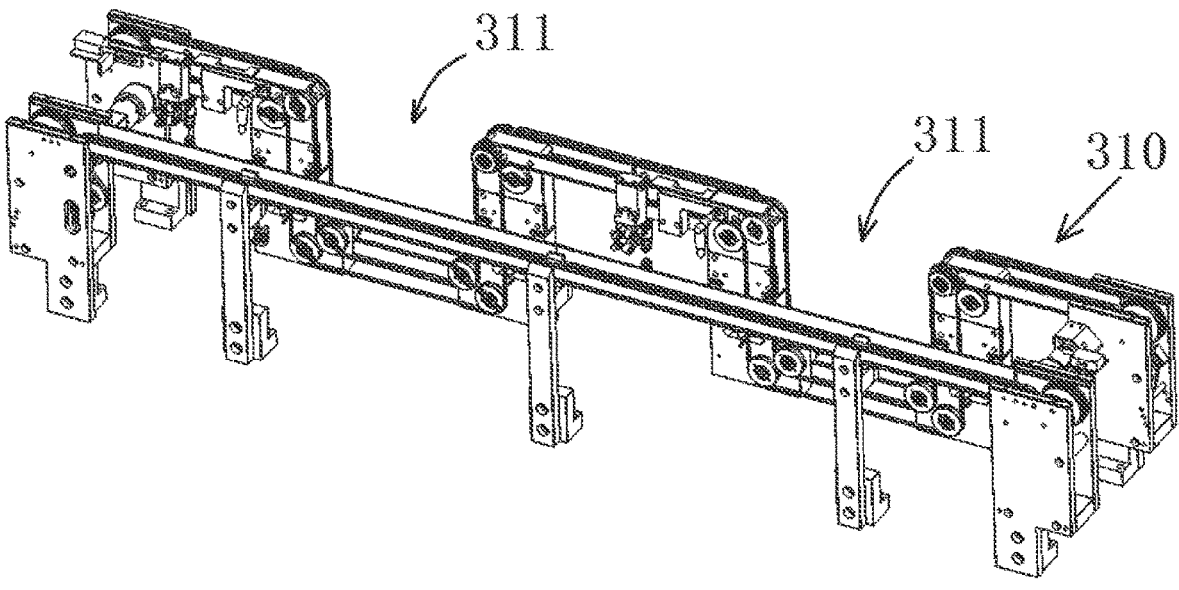
FIG. 5 shows an illustrative plan view of a second transmission device according to an exemplary embodiment of the present invention.

FIG. 5 shows an illustrative plan view of a second transmission device 310 according to an exemplary embodiment of the present invention. As shown in FIGS. 1 to 11, the docking station 30 also includes a second transmission device 310 adapted to transmit the carrier 22, and thus the component 2 without the seal ring 1 loaded thereon. The second transmission device 310 is adapted to interface with the first transmission device 21 on the seal ring installation module 20 to allow the carrier 22 to be continuously transmitted on the first transmission device 21 and the second transmission device 310.

The second transmission device 310 includes an interruption gap 311. The first transmission device 21 is adapted to be docked in the interruption gap 311 of the second transmission device 310 to realize the connection between the first transmission device 21 and the second transmission device 310. In this way, continuous transmission of the carrier 22 on the first transmission device 21 and the second transmission device 310 can be realized.

The docking station 30 also includes a locking device, which is installed on the frame 320 to lock the first mobile car 200 and the second mobile car 100 in the docking chambers 300 of the frame 320. This prevents the seal ring supply module 10 and the seal ring installation module 20 from being moved when docking with the docking station 30.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A seal ring installation module, comprising:
a seal ring pickup and transfer device adapted to pick up a seal ring and transfer the seal ring to a component, including:
a support member having an external shape or at least one external dimension corresponding to those of the component; and
an outer cylinder sleeved on the support member, one end of the support member protrudes from an opening at one end of the outer cylinder to pick up and support the seal ring, one of the outer cylinder or the support member is movable axially relative to the other and adapted to, with the component axially aligned with and contacting the one end of the support member, transfer the seal ring supported on the one end of the support member from the support member to the component under a biasing force applied by an end face of one end of the outer cylinder, a guide slot extending axially is formed on one of the outer cylinder or the support member, and a convex guide pin is formed on the other of the outer cylinder or the support member.

2. The seal ring installation module according to claim 1, wherein the outer cylinder is fixed, and the support part is movable axially with respect to the outer cylinder.

3. The seal ring installation module according to claim 2, further comprising a spring supporting the support member such that the support member is elastically supported in the axial direction with respect to the outer cylinder.

4. The seal ring installation module according to claim 2, wherein after the component is axially aligned with and contacts the one end of the support member, the component pushes the support member to move towards the inside of the outer cylinder for transferring the seal ring to the component.

5. The seal ring installation module according to claim 1, wherein the guide pin is slidably mated with the guide slot to guide one of the support member or the outer cylinder to move axially with respect to the other.

6. The seal ring installation module according to claim 1, wherein an inner cavity of the outer cylinder is complementary in shape to a shape of the support member and a shape of the component.

7. The seal ring installation module according to claim 1, further comprises a seal ring opening device having two seal ring opening units adapted to open two seal rings to a predetermined expansion state, each seal ring opening unit including:
a support plate formed with a plurality of channels;
a plurality of pins adapted to be synchronously moved away from each other along the plurality of channels to expand the seal ring; and
a first driving device driving the plurality of pins to move.

8. The seal ring installation module according to claim 7, wherein, when one end of the support member of the seal ring pickup and transfer device is inserted into the opened seal ring, the plurality of pins are moved out of the plurality of channels and the seal ring is released and transferred to the one end of the support member.

9. The seal ring installation module according to claim 8, wherein the seal ring opening device further comprises:

a rotating plate on which the two seal ring opening units are installed; and a second driving device driving the rotating plate to rotate.

10. The seal ring installation module according to claim 9, wherein:

when one of the two seal ring opening units is turned to a seal ring loading station by the rotating plate, the other is turned to a seal ring expansion station;

when the seal ring opening unit is rotated to the seal ring loading station, the seal ring is loaded on the plurality of pins; and when the seal ring opening unit is rotated to the seal ring expansion station, the seal ring is expanded to the predetermined expansion state by the plurality of pins.

11. The seal ring installation module according to claim 10, further comprising:

a first transmission device transmitting a carrier for loading the component which has not been installed with the seal ring; and a first robot grasping the component and moving the grasped component such that the component is axially aligned with the one end of the support member and pushes the support member to move toward the interior of the outer cylinder.

12. The seal ring installation module according to claim 11, further comprising a discharge funnel adapted to unload the component which has been installed with the seal ring into a container, after the seal ring has been installed on the component, the first robot places the component into an inlet of the discharge funnel.

13. A seal ring installation module, comprising:

a seal ring pickup and transfer device adapted to pick up a seal ring and transfer the seal ring to a component, including:

a support member having an external shape or at least one external dimension corresponding to those of the component; and an outer cylinder sleeved on the support member, one end of the support member protrudes from an opening at one end of the outer cylinder to pick up and support the seal ring, one of the outer cylinder or the support member is movable axially relative to the other and adapted to, with the component axially aligned with and contacting the one end of the support member, transfer the seal ring supported on the one end of the support member from the support member to the component under a biasing force applied by an end face of one end of the outer cylinder; and a seal ring opening device having two seal ring opening units adapted to open two seal rings to a predetermined expansion state, each seal ring opening unit including:

a support plate formed with a plurality of channels;

a plurality of pins adapted to be synchronously moved away from each other along the plurality of channels to expand the seal ring; and a first driving device driving the plurality of pins to move.

14. The seal ring installation module according to claim 13, wherein, when one end of the support member of the seal ring pickup and transfer device is inserted into the opened seal ring, the plurality of pins are moved out of the plurality of channels and the seal ring is released and transferred to the one end of the support member.

15. The seal ring installation module according to claim 14, wherein the seal ring opening device further comprises:

a rotating plate on which the two seal ring opening units are installed; and a second driving device driving the rotating plate to rotate.

16. The seal ring installation module according to claim 15, wherein:

when one of the two seal ring opening units is turned to a seal ring loading station by the rotating plate, the other is turned to a seal ring expansion station;

when the seal ring opening unit is rotated to the seal ring loading station, the seal ring is loaded on the plurality of pins; and when the seal ring opening unit is rotated to the seal ring expansion station, the seal ring is expanded to the predetermined expansion state by the plurality of pins.

17. The seal ring installation module according to claim 16, further comprising:

a first transmission device transmitting a carrier for loading the component which has not been installed with the seal ring; and a first robot grasping the component and moving the grasped component such that the component is axially aligned with the one end of the support member and pushes the support member to move toward the interior of the outer cylinder.

18. The seal ring installation module according to claim 17, further comprising a discharge funnel adapted to unload the component which has been installed with the seal ring into a container, after the seal ring has been installed on the component, the first robot places the component into an inlet of the discharge funnel.

* * * * *